United States Patent
Moriyama et al.

(10) Patent No.: US 11,118,947 B2
(45) Date of Patent: Sep. 14, 2021

(54) INFORMATION PROCESSING DEVICE, INFORMATION PROCESSING METHOD AND NON-TRANSITORY COMPUTER READABLE MEDIUM

(71) Applicant: Kabushiki Kaisha Toshiba, Tokyo (JP)

(72) Inventors: Takuro Moriyama, Tokyo (JP); Gaku Ishii, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 335 days.

(21) Appl. No.: 16/238,679

(22) Filed: Jan. 3, 2019

(65) Prior Publication Data
US 2019/0204124 A1 Jul. 4, 2019

(30) Foreign Application Priority Data
Jan. 4, 2018 (JP) .............................. JP2018-000290

(51) Int. Cl.
  *G06F 11/30* (2006.01)
  *G01D 18/00* (2006.01)
  *G01D 3/032* (2006.01)

(52) U.S. Cl.
  CPC ............. *G01D 18/00* (2013.01); *G01D 3/032* (2013.01)

(58) Field of Classification Search
  CPC .................................................... G01D 18/00
  See application file for complete search history.

(56) References Cited

U.S. PATENT DOCUMENTS

2017/0140287 A1* 5/2017 Moriyama ............. G05B 13/04
2018/0188083 A1 7/2018 Moriyama et al.

FOREIGN PATENT DOCUMENTS

| JP | 2003-270004 | A | 9/2003 |
| JP | 2003-271231 | A | 9/2003 |
| JP | 4436227 | B2 | 3/2010 |
| JP | 2010-181949 | A | 8/2010 |
| JP | 2017-187820 | A | 10/2017 |
| JP | 6240050 | B2 | 11/2017 |
| JP | 2018-44958 | A | 3/2018 |
| WO | WO 2017/134908 | A1 | 8/2017 |

OTHER PUBLICATIONS

Moriyama et al., U.S. Appl. No. 15/908,742, filed Feb. 28, 2018.

* cited by examiner

*Primary Examiner* — Phuong Huynh
(74) *Attorney, Agent, or Firm* — Finnegan, Henderson, Farabow, Garrett & Dunner L.L.P.

(57) ABSTRACT

According to one embodiment, an information processing device includes an anomaly detector and an integration unit. The anomaly detector is configured to estimate a degree of drift anomaly based on measured values of a sensor during a sub-period which is a part of a monitored period. The integration unit is configured to estimate the degree of drift anomaly accumulated within the monitored period based on the estimated degrees of drift anomaly accumulated within the sub-periods. Symptoms of a drift anomaly include mismatches between the actual values and measured values.

19 Claims, 14 Drawing Sheets

| TIME OF MEASUREMENT | CONDITION OF MEASUREMENT | MEASURED VALUE |
|---|---|---|
| 0:00 | OPERATING | 0.1 |
| 0:01 | OPERATING | 0.5 |
| 0:02 | NOT OPERATING | 1.2 |

FIG. 2

MONITORED PERIOD FOR DETECTING DRIFT ANOMALIES:
MARCH 2013 TO NOVEMBER 2017

| SENSOR | MEAN DEG DRIFT ANOMALY | RESULT |
| --- | --- | --- |
| SENSOR#1 | 0.5 | NORMAL |
| SENSOR#2 | 0.2 | NORMAL |
| SENSOR#3 | 1.1 | ABNORMAL |
| SENSOR#4 | 0.8 | NORMAL |
| ⋮ | ⋮ | ⋮ |

FIG. 13

ND NON-TRANSITORY COMPUTER
INFORMATION PROCESSING DEVICE, INFORMATION PROCESSING METHOD AND NON-TRANSITORY COMPUTER READABLE MEDIUM

CROSS-REFERENCE TO RELATED APPLICATIONS

This application is based upon and claims the benefit of priority from Japanese Patent Application No. 2018-000290, filed on Jan. 4, 2018; the entire contents of which are hereby incorporated by reference.

FIELD

Embodiments described herein relate generally to an information processing device, an information processing method and a non-transitory computer readable medium.

BACKGROUND

Controlling processes which are based on values measured by sensors are common in various devices including air conditioners. For adequate control of the devices, the accuracy of values obtained from sensors is crucial. One factor which affects the accuracy of measured values is drift anomalies of sensors. When a drift anomaly occurs, mismatches between the actual values and the measured values are observed. Drift anomalies become apparent after a long time, usually after years. If drift anomalies can be detected, it is possible to calibrate sensors with drift anomalies earlier than planned. Also, it would be possible to assign different degrees of priority to sensors for maintenance, enabling effective maintenance of sensors. It also helps preventing abnormal behavior of devices and inefficient operations.

Methods for detecting drift anomalies from changes in the trend of measured values have been developed. If the cause of the changes in trend of measured values is limited to drift anomaly, detection of drift anomalies is not difficult. However, other factors including varying conditions of usage or changes in external environments also cause changes in the trend of measured values. If the causes of changes in the trend of measured values include factors other than drift anomalies, the performance of drift anomaly detection suffers, because changes caused by factors other than drift anomalies are not distinguished from those caused by drift anomalies. Detection of drift anomalies over a long time is difficult since factors other than drift anomalies affect measured values.

BRIEF DESCRIPTION OF THE DRAWINGS

FIG. 2 is a table including an example of measured data;

FIG. 13 is a diagram of results shown on a display device; and

DETAILED DESCRIPTION

According to one embodiment, an information processing device includes an anomaly detector and an integration unit. The anomaly detector is configured to estimate a degree of drift anomaly based on measured values from a sensor during a sub-period which is a part of a monitored period. The integration unit is configured to estimate the degree of drift anomaly accumulated within the monitored period based on the estimated degree of drift anomaly accumulated within each sub-period. Symptoms of a drift anomaly include mismatches between actual values and measured values.

Hereinafter, embodiments of the present invention will be described with reference to the drawings.

First Embodiment

Figure 1:
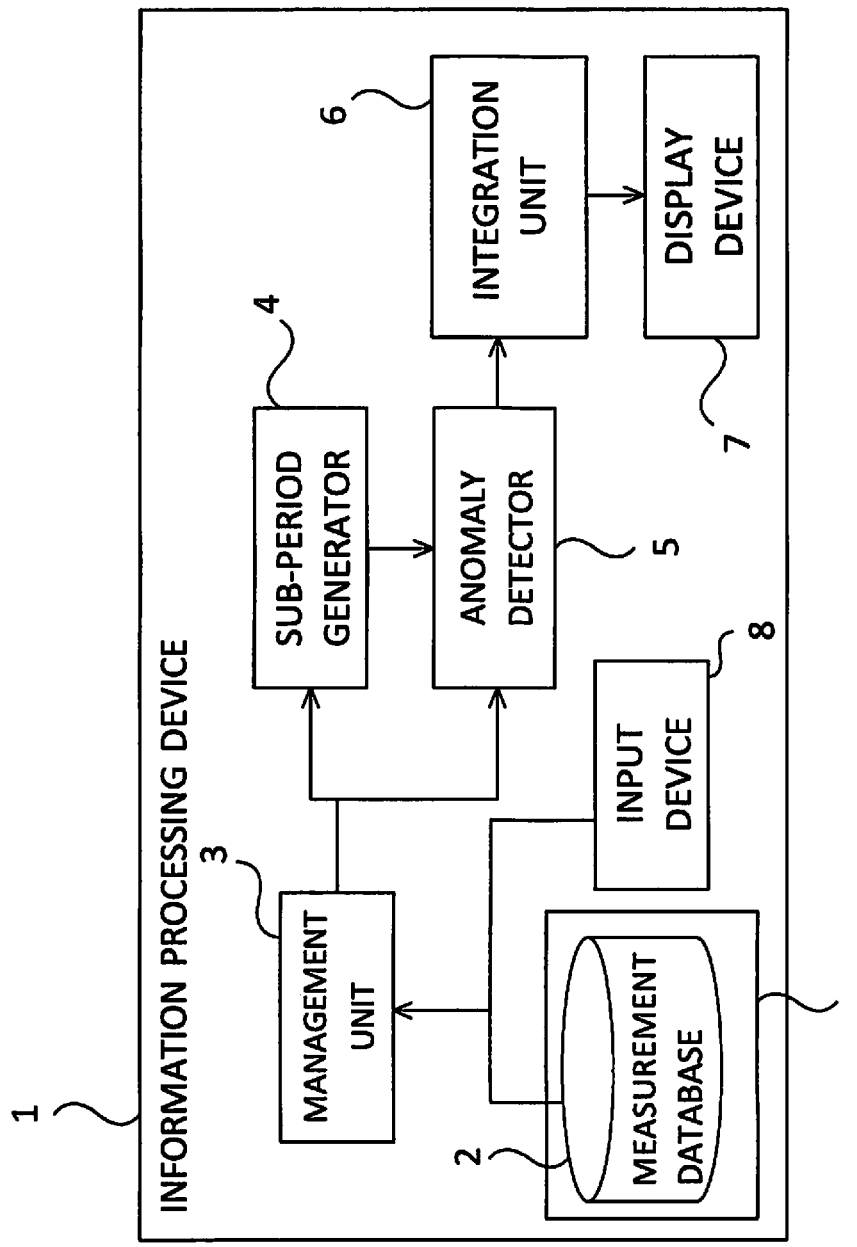
FIG. 1 is a block diagram of an information processing device in accordance to a first embodiment.

FIG. 1 is a block diagram of an information processing device in accordance to a first embodiment. An information processing device according to a first embodiment will be described with reference to FIG. 1.

First, an overview of the information processing device according to the embodiment is explained. An information processing device 1 in FIG. 1 estimates the degree of drift anomaly based on data measured in a specified period (monitored period). Then, the information processing device 1 determines whether the drift anomaly has occurred based on an estimated degree of drift anomaly accumulated within the monitored period.

As mentioned above, the probability that the changes in the trend of measured values are caused by factors other than the drift anomalies is greater if the monitored period is longer. Therefore, the information processing device according to the embodiment generates sub-periods, each of which is a part of the monitored period. In one embodiment, a plurality of sub-periods is generated. Then, the information processing device 1 estimates the degree of drift anomaly for each sub-period. Below, a sub-task is the process of estimating the degree of drift anomaly for the corresponding sub-period.

In the sub-periods, it is less likely that the changes in the trend of measured values are caused by factors other than drift anomalies. Therefore, it becomes easier to execute drift anomaly detection by using the sub-periods. Finally, based on the results of drift anomaly detection from a plurality of sub-tasks, the degree of drift anomaly for the monitored period is estimated. The process which estimates the degree of drift anomaly for the monitored period is called the main task. In one embodiment, the result obtained by the main task is visualized by using display devices. In another embodiment, the analysis which determines whether the drift anomaly occurred or not is visualized by using display devices. This analysis is obtained by comparing the degree of drift anomaly for the monitored period or the result of the main task with a threshold value.

Next, each component in the information processing device 1 is described.

The information processing device 1 in FIG. 1 includes a measurement database 2, a management unit 3, a sub-period generator 4, an anomaly detector 5, an integration unit 6, a display device 7, an input device 8 and a storage 9.

The measurement database 2 stores measured values of sensors in devices and systems, along with information of the measured time. In the following, data stored in the measurement database 2 is called measurement data. In one embodiment, the measurement data includes the measured times (for example, date and time) and the measured values. However, in another embodiment, the measurement data includes other values. FIG. 2 is an example of the measurement data stored in the measurement database 2.

FIG. 2 is an example of measurement data from a sensor. Each row in FIG. 2 corresponds to one entry of the measurement data. The measurement data in FIG. 2 includes the times of measurements, conditions of measurements and the measured values. The conditions of measurement include the condition of the device where the sensor is implemented, the condition of the sensor itself during the time of measurement, and the configured value of the device set by a controller. In one embodiment, the conditions of measurements include a plurality of items. The operation status of the device where the sensor is implemented (for example, steady-state operation, launched or halted) and the information on the external environment (temperature and humidity) are examples of the conditions of measurements.

The measurement database 2 stores the aforementioned measurement data for each sensor. In one embodiment, the measurement data for each sensor is stored in separate tables. In another embodiment, the measurement data for a plurality of, sensors is stored in one table. In one embodiment, the measurement database 2 is stored in the storage 9. In another embodiment, the measurement database 2 is stored in external storage devices or servers.

The management unit 3 obtains measurement data used for detecting drift anomalies from the measurement database 2. Then, the management unit 3 transfers the measurement data to the sub-period generator 4 and the anomaly detector 5. When the monitored period and the threshold value are specified, the management unit 3 generates a main task.

The sub-period generator 4 generates sub-periods and sub-tasks. A sub-period is a part of the monitored period. A sub-task is the process of estimating the degree of drift anomaly accumulated within the corresponding sub-period. The number of sub-periods generated by the sub-period generator 4 is not limited. Thus, in some cases, only one sub-period is generated. In other cases, a plurality of sub-periods is generated. The length of the sub-periods does not have to be uniform. As long as the length of the generated sub-period is shorter than the length of the monitored period, the length of the sub-period is not limited. Chronological overlaps within a plurality of sub-periods are allowed. The generated sub-periods do not need to cover the whole monitored period. Thus, the sub-period generator 4 can generate the sub-period excluding a part of the monitored period. Examples of sub-periods and methods to determine sub-periods are described later.

The anomaly detector 5 executes sub-tasks and saves the estimated degrees of drift anomaly to a storage 105. In one embodiment, the anomaly detector 5 estimates the amount of drift accumulated within the sub-period. The amount of drift is the size of the mismatch between the actual value of the sensor and the measured value. In one embodiment, the degree of drift anomaly is the amount of drift. However, the type of indicators used to express the degree of drift anomaly is not limited. The type of indicators provided from the sub-task depends on the implementation of the anomaly detector 5. In one embodiment, a plurality of sub-tasks is executed concurrently. In another embodiment, the sub-tasks are executed sequentially.

Examples of the methods used to estimate the degree of drift anomaly include linear models, support vector machines and neural networks. However, the type of method used is not limited. If the anomaly detector 5 uses methods which output binary values (true/false), it is possible to use continuous intermediate values which are correlated to the output value.

The integration unit 6 estimates the degree of drift anomaly for the monitored period by executing the main task. The main task uses the results from a plurality of sub-tasks in order to estimate the amount of drift accumulated within the monitored period. If the amount of drift is estimated in the anomaly detector 5, the summation of the amount from the sub-tasks is one of the estimated degree of drift anomaly included in the result of the main task. In one embodiment, the integration unit 6 stores the degree of drift anomaly derived from the main task to the storage 105. If a threshold value is specified during the generation of the main task, the estimated degree of drift anomaly and the threshold value are compared to determine whether drift anomalies occurred or not during the monitored period. Then, the comparison result is saved in the storage 105.

In one embodiment, the integration unit 6 determines and outputs whether drift anomalies occurred or not during the monitored period. In one embodiment, the integration unit 6 outputs only the degree of drift anomaly. In one embodiment, the integration unit 6 outputs both the degree of drift anomaly and the true/false on the occurrence of drift anomalies.

The display device 7 converts the data provided by the integration unit 6 to graphical data or text data in specific formats. Then, the data is displayed on a display device 7. The degree of drift anomaly and the true/false on the occurrence of drift anomalies are shown on the display device 7. In one embodiment, the results of sub-tasks provided by the anomaly detector 5 are shown on the display device 7. Examples of display devices include liquid crystal displays (LCDs), cathode ray tube displays and organic electroluminescence displays. However, the type of device used as the display device 7 used is not limited.

In one embodiment, each component including the management unit 3, the sub-period generator 4, the anomaly detector 5, the integration unit 6 and the display device 7 is implemented with hardware circuitry (for example, processing circuits) such as semiconductor circuits, FPGA, PLD and ASIC. In another embodiment, the components are implemented with software (programs) operating on the microprocessors. In one embodiment, a combination of the above are used to implement the components. The programs executed by the information processing device 1 are stored in the storage 9.

The input device 8 is a device used to input information into the information processing device 1. Examples of the input device 8 include a keyboard, a mouse or a touch panel.

However, the type of device used is not limited. By using the input device 8, the user specifies the sensor or devices which are subject to drift anomaly detection. It is also possible to specify the monitored period from the input device 8. It is possible to input instructions to start various processes from the input device 8.

The storage 9 provides storage space for saving programs and various data. Examples of the storage 9 include: volatile memories such as RAM and DRAM; non-volatile memory such as NAND flash memory, MRAM and FRAM; and storage devices such as hard disks and SSDs. In one embodiment, the storage 9 is implemented in the information processing device 1. In another embodiment, the storage 9 is implemented in an external storage device. In one embodiment, the storage 9 is a removable storage medium such as SD memory cards and USB memory.

Next, the hardware configuration of the information processing device according to the embodiment is described. In one embodiment, the information processing device is configured by using a computer 100. Examples of the computer 100 include various devices such as servers, clients, microcomputers, tablets, smartphones, personal computers and general purpose computers.

Figure 14:
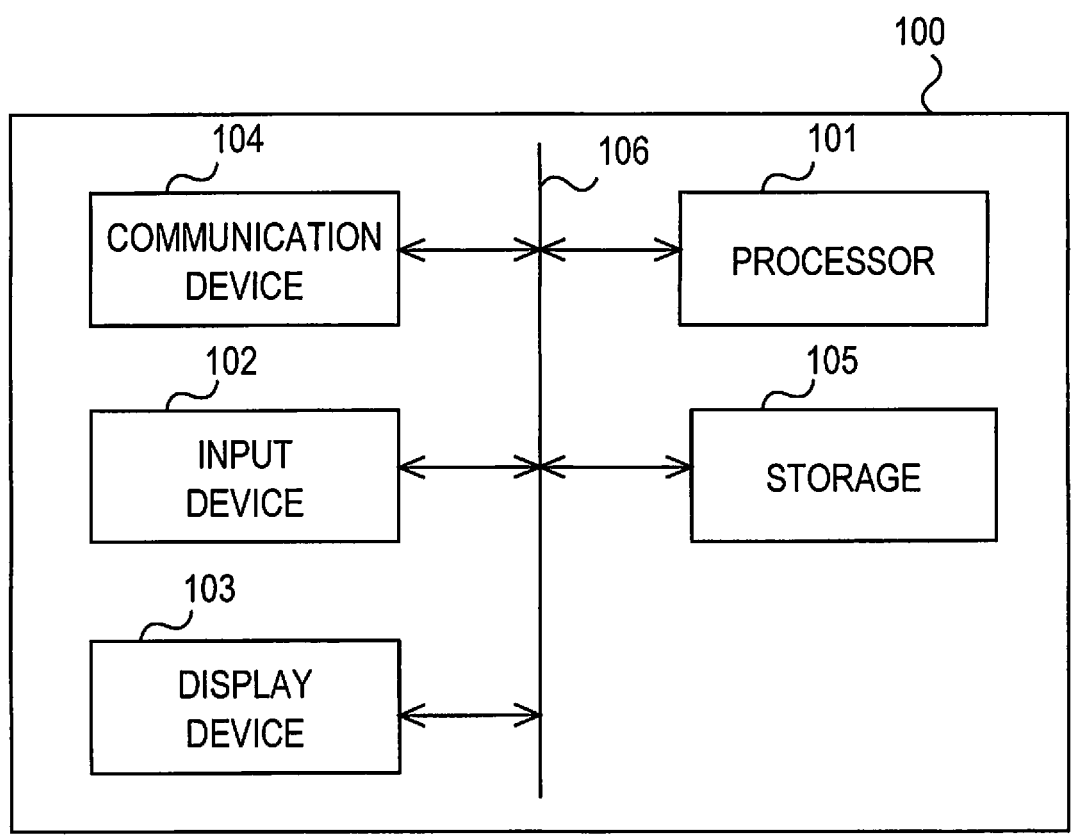
FIG. 14 is a block diagram of hardware in accordance with one or more embodiments.

FIG. 14 is an example of the computer 100. The computer 100 in FIG. 14 includes a processor 101, an input device 102, a display device 103, a communication device 104 and a storage 105. The processor 101, the input device 102, the display device 103, the communication device 104 and the storage 105 are connected to each other via a bus 106.

The processor 101 is an electric circuit including the controller and arithmetic unit of the computer 100. It is possible to use general purpose processors, central processing units (CPUs), microprocessors, digital signal processors, controllers, microcontrollers, state-machines, ASICs, FPGAs, PLDs or a combination of the above as the processor 101.

The processor 101 executes arithmetic operations by using data or programs provided by devices connected via the bus 106 (for example, the input device 102, the communication device 104 and the storage 105). Also, the processor 101 transmits the calculated results and control signals to the devices connected via the bus 106 (for example, the display device 103, the communication device 104 and the storage 105). Specifically, the processor 101 executes the OS (the operating system) of the computer 100 and drift anomaly detection programs. Also, the processor controls various devices which configure the computer 100.

The drift anomaly detection program is a program which enables the computer 100 to execute the aforementioned functions of the information processing device 1. The drift anomaly detection program is stored in non-transitory storage medium which is readable by the computer. Examples of the storage medium include optical discs, magnetic discs, magnetic tapes, flash memories and semiconductor memory. However, the type of storage medium is not limited. When the processor 101 executes the drift anomaly detection program, the computer 100 operates as the information processing device according to the embodiments.

The input device 102 is a device for entering information to the computer 100. Examples of the input device 102 include a keyboard, a mouse and touch panels. However, the type of device is not limited. By using the input device 102, the user specifies the sensors which are subject to drift anomaly detection. The user also specifies the monitored period for drift anomaly detection. The user also enters instructions for starting the drift anomaly detection process by using the input device 102.

The display device 103 displays graphics and videos. Examples of the display device 103 include a LCD (liquid crystal display), CRT (cathode ray tube) or an organic electroluminescence display. However, the type of display devices used is not limited. Contents displayed on the display device 103 include the results of drift anomaly detection and the estimated degree of drift anomaly on each sensor. The examples are shown in FIG. 13.

The communication device 104 enables the computer 100 to communicate with external devices via wireless or wired communication mediums. Examples of the communication device 104 include Network Interface Cards, communication modules, hubs and routers. However, the type of device is not limited. In one embodiment, the management unit 3 collects data from buildings where sensors are installed, via the communication device 104.

The storage 105 saves the operating system of the computer 100, the drift anomaly detection program, data necessary to execute the drift anomaly detection program and data generated by the drift anomaly detection program. The storage 105 includes the main storage device and the external storage device. Examples of the main storage device include RAM, DRAM and SRAM. However, the type of device used as the main storage device is not limited. Also, examples of the external storage device include HDD, optical discs, flash memory and magnetic tapes. However, the type of device used as the external storage is not limited. In one embodiment, the measurement database 2 is configured on the storage 105. In another embodiment, the measurement database 2 is configured on external servers or external storage.

In one embodiment, the computer 100 includes a plurality of processors 101, input devices 102, display devices 103, communication devices 104 and storage 105. In another embodiment, the computer 100 is connected to peripheral devices such as printers or scanners.

In one embodiment, the information processing device 1 is configured with a single computer 100. In another embodiment, the information processing device 1 is configured with a plurality of computers which are connected to each other.

In one embodiment, the drift anomaly detection program is stored in the storage 105 of the computer 100. In another embodiment, the drift anomaly detection program is stored in the external storage. In one embodiment, the drift anomaly detection program is uploaded to the internet. By installing the drift anomaly detection program to the computer 100, the functions of the information processing device 1 become executable.

Figure 3:
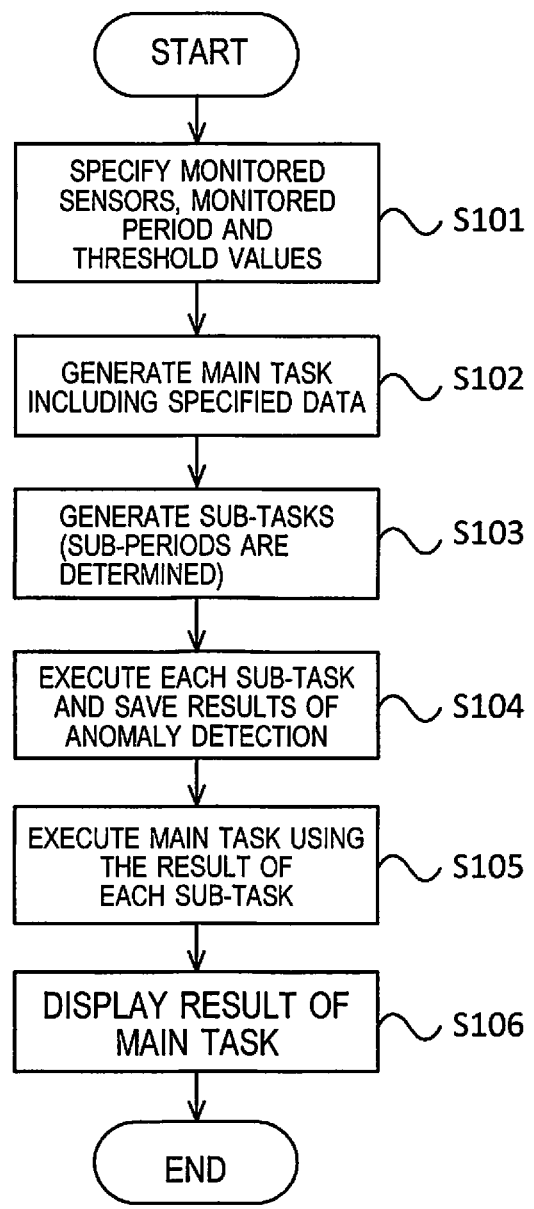
FIG. 3 is a flowchart of a process executed by the information processing device in accordance to the first embodiment.

FIG. 3 is a flowchart of a process executed by the information processing device in accordance to the first embodiment. In the following, the process is described with reference to FIG. 3.

First, the sensors which are subject to drift anomaly detection (the monitored sensors), the monitored period and the threshold value used for detecting drift anomalies are specified (Step S101). In one embodiment, the user specifies the aforementioned configuration information by using the input device 8. In another embodiment, signals transmitted by external terminals or external information processing devices are received by the communication device 104. By using the information included in the signal, the aforementioned configuration information is specified. The number of monitored sensors could be either one sensor or a plurality of sensors. The number of thresholds is not limited to one threshold value per sensor. Thus, in one embodiment, one threshold value is used for all the sensors. In another embodiment, threshold values are configured for each sensor. Examples of the length of the monitored period include one year or a few years. However, the length of the monitored period is not limited.

Next, the management unit 3 generates the main task including information necessary to execute drift anomaly detection (step S102). Examples of the information included in the main task include the monitored sensor and the monitored period. Examples of the monitored sensor include thermometers and hygrometers. An example for the monitored period is January 2000 to January 2002. Here, the monitored period for the main task is equal to the monitored period of the information processing device 1. In one embodiment, the management unit 3 saves the data of the main task in the storage 105, after the main task is generated. In another embodiment, the data of the main task is transmitted to the sub-period generator 4.

Then, the sub-period generator 4 generates the sub-tasks (step S103). The sub-period generator 4 generates sub-tasks by changing the monitored period of the main task. In one embodiment, the sub-period generator 4 saves the data of the sub-tasks to the storage 105, after the sub-tasks are generated. In another embodiment, the data of the sub-tasks is transmitted to the anomaly detector 5.

The monitored period (period for drift anomaly detection) of the sub-task is the aforementioned sub-period which is configured within the monitored period of the main task. There are various patterns of sub-periods. Hereinafter, few examples of the patterns are described.

Figure 4:
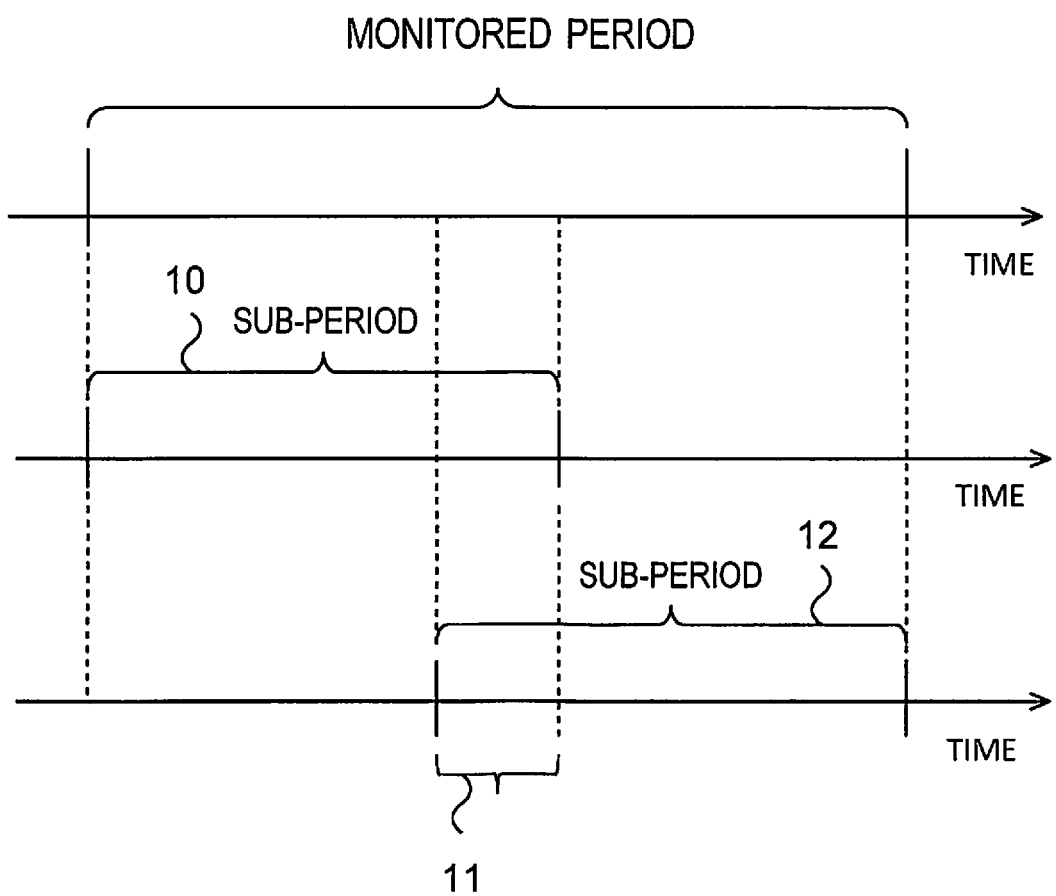
FIG. 4 is a diagram of a case when overlapping sub-periods are configured.
Figure 5:
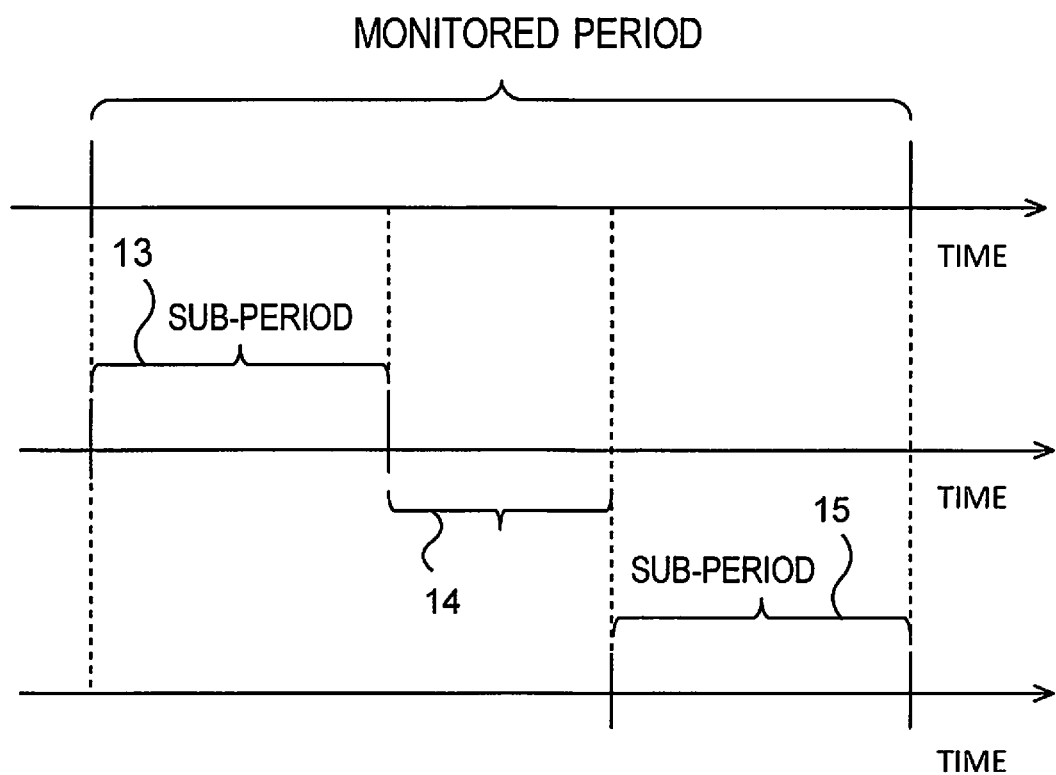
FIG. 5 is a diagram of a case when sub-periods are configured partially.
Figure 6:
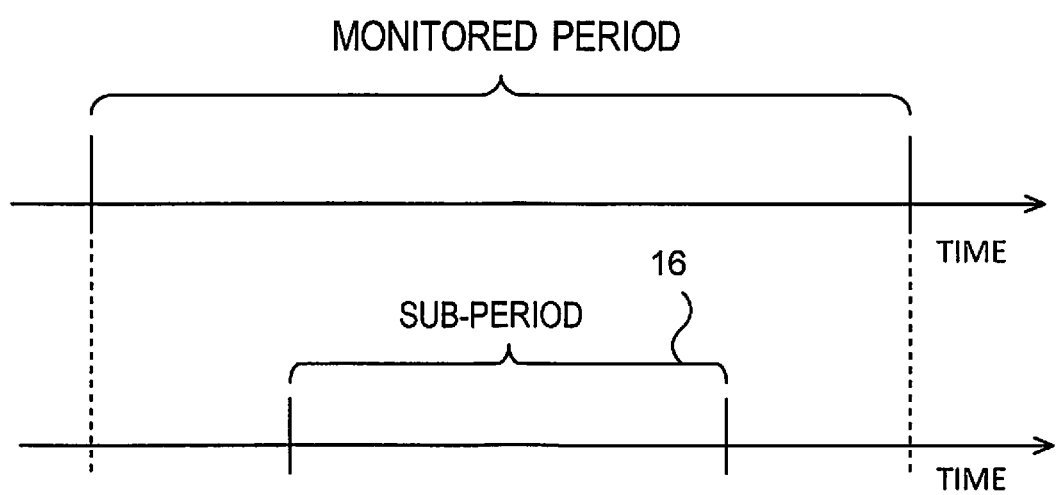
FIG. 6 is a diagram of a sub-period within a monitored period.

FIG. 4 to FIG. 6 illustrates examples of sub-periods. Below, the examples of the sub-periods are explained.

FIG. 4 is a diagram of a case when overlapping sub-periods are configured. In FIG. 4, the whole monitored period is covered by a sub-period 10 and a sub-period 12. The sub-period 10 and the sub-period 12 overlap within a period 11. Thus, chronological overlaps between the sub-periods are allowed.

FIG. 5 is a diagram of a case when sub-periods are configured partially. In FIG. 5, a sub-period 13 and a sub-period 15 cover parts of the monitored period. However, period 14 within the monitored period is not included in either of the sub-periods. In one embodiment, a part of the monitored period is included in neither of the sub-periods. If a part of the monitored period is included in neither of the sub-periods, the part of monitored period is being excluded from the sub-periods.

FIG. 6 is a diagram of a sub-period within a monitored period. As illustrated in FIG. 6, in one embodiment, only one sub-period is configured within the whole monitored period.

In one embodiment, the sub-period generator 4 configures the sub-periods to ensure that the accuracy of estimated degree of drift anomaly from each sub-task is sufficiently high. For example, if it is known that there are intervals when sufficient measured values are not available due to missing measurements, it is possible to avoid such intervals when the sub-periods are generated.

In the following, the flowchart of FIG. 3 is explained.

The anomaly detector 5 executes each sub-task and saves the results (step S104). The details of the process executed in step S104 are explained in the description of the anomaly detector 5 mentioned above. The results of the sub-tasks are stored in the storage 105. Examples of the stored results include the estimated degree of drift anomaly in each sub-period. However, it is possible to include other information.

Then, the integration unit 6 executes the main task, using the results of the sub-tasks (step S105). If only one sub-task is generated and only the result of the single sub-task is available, it is possible to use the result of the sub-task as the result of the main task. The result of the main task is saved in the storage 105.

Next, the case when the amount of drift is used as the degree of drift anomaly is explained as an example.

Figure 7:
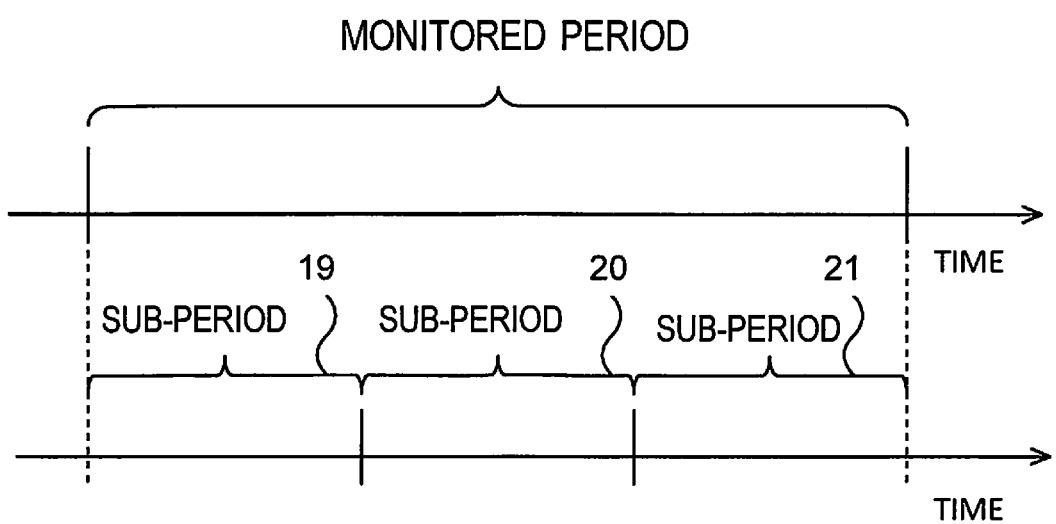
FIG. 7 is a diagram of a case when the monitored period is divided into a plurality of sub-periods.

FIG. 7 is a diagram of a case when the monitored period is divided into a plurality of sub-periods. In FIG. 7, the monitored period is divided into three sub-periods (sub-periods 19, 20 and 21). If there are no overlaps within the sub-periods and there are no periods which are not covered by either of the sub-periods, a plausible estimation of the degree of drift anomaly accumulated within the monitored period is the sum of the degrees of drift anomaly from the sub-tasks.

The amount of drift, which is used as the degree of drift anomaly, accumulates with the lapse of time. Therefore, the sum of the degree of drift anomaly from the sub-task corresponding to sub-period 19, the degree of drift anomaly from the sub-task corresponding to sub-period 20 and the degree of drift anomaly from the sub-task corresponding to sub-period 21 is supposed to be a plausible estimation of the degree of drift anomaly accumulated within the monitored period.

Figure 8:
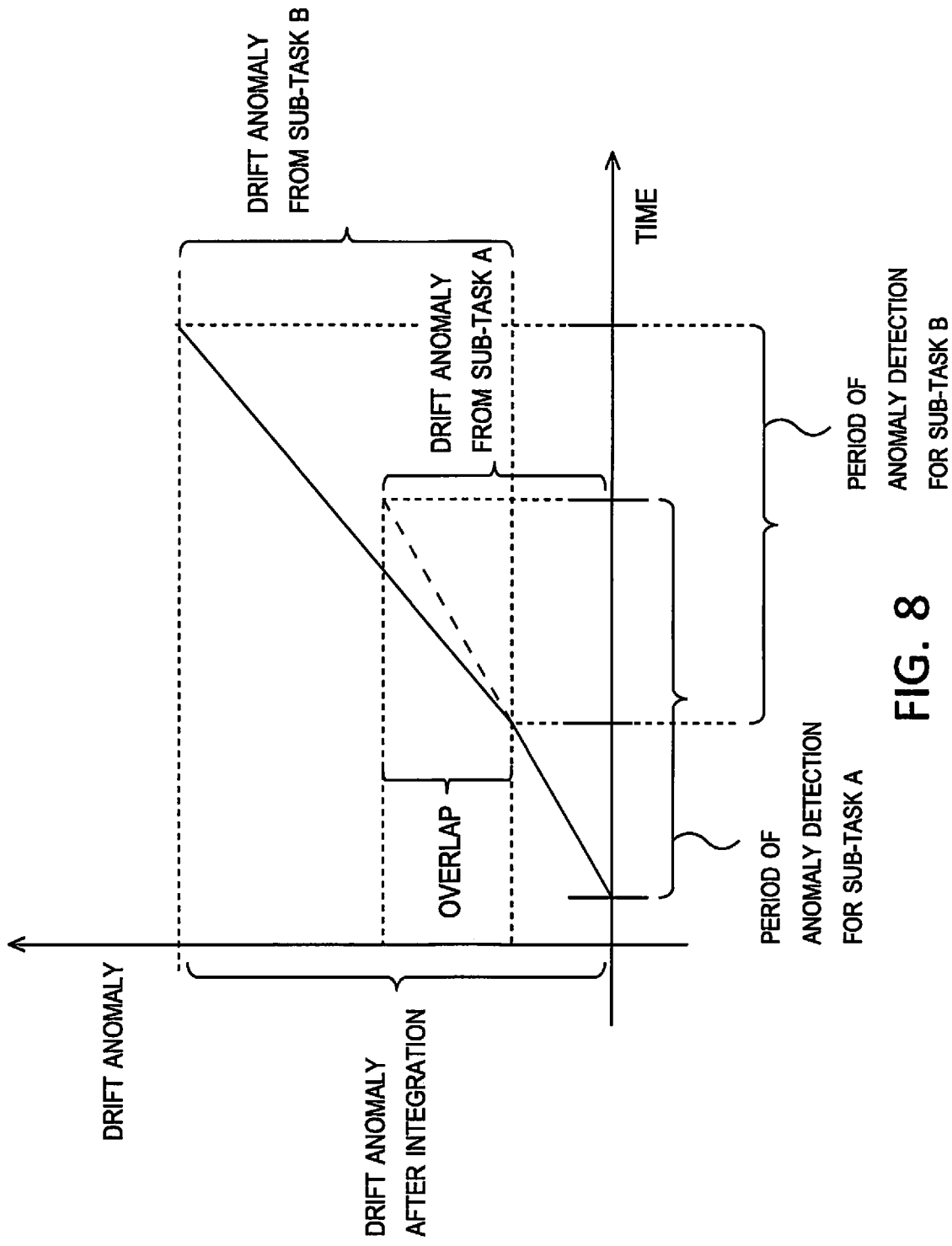
FIG. 8 is a diagram of the case when overlapping sub-periods are integrated.
Figure 9:
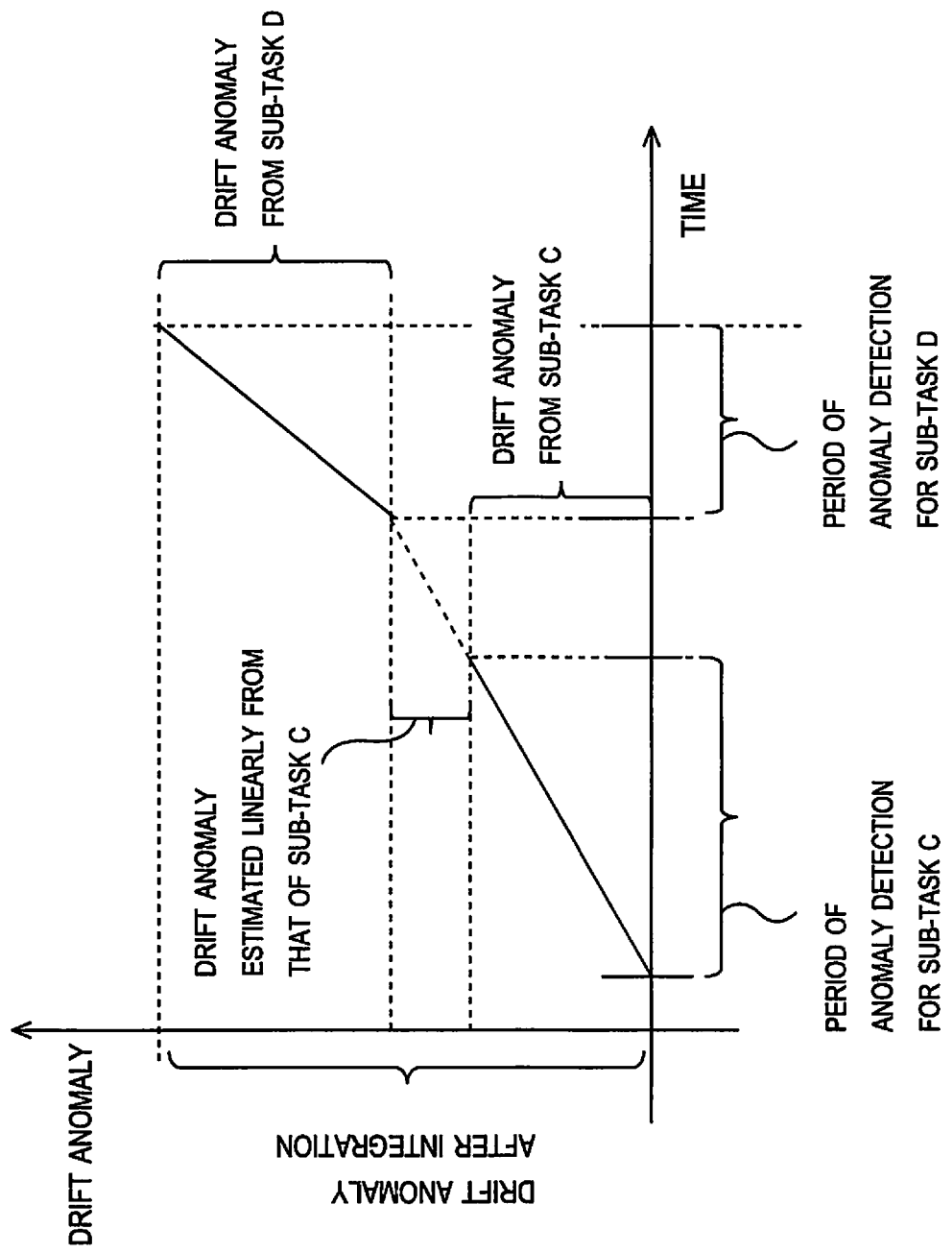
FIG. 9 is a diagram of the case when partially configured sub-periods are integrated.

FIG. 8 is a diagram of the case when overlapping sub-periods are integrated. FIG. 9 is a diagram of the case when partially configured sub-periods are integrated. In graphs of FIG. 8 and FIG. 9, the vertical axis corresponds to the degree of drift anomaly (amount of drift in the embodiment). The horizontal axis corresponds to the time. In the following, a method for integrating the results of the sub-tasks is explained with reference to FIG. 8 and FIG. 9.

In the example of FIG. 8, there is an overlap in the sub-periods of sub-task A and sub-task B. In the example of FIG. 9, there is a period which belongs to neither the sub-period of sub-task C nor the sub-period of sub-task D. In such cases, it is possible to estimate the degree of drift anomaly accumulated within the monitored period by assuming that the degree of drift anomaly accumulates linearly (proportionally) to the elapsed time.

First, in the example of FIG. 8, the estimated degree of drift anomaly from sub-task A and the estimated degree of drift anomaly from sub-task B are added. Second, the degree of drift anomaly accumulated within the overlapping period is estimated based on the estimated degree of drift anomaly from sub-task A and the assumption of linear accumulation on the degree of drift anomaly. Then, the estimated degree of drift anomaly accumulated within the overlapping period is subtracted from the result of the addition. The result of the subtraction is the estimated degree of drift anomaly accumulated within the monitored period.

In the example of FIG. 8, two sub-periods are overlapping. However, in one embodiment, more than two sub-periods are overlapping for some of the intervals within the monitored period. In such cases, it is possible to use methods other than the aforementioned subtraction method for estimating the degree of drift anomaly within the monitored period. For example, the average value of the estimated degrees of the drift anomaly for an overlapping period can be used as the conclusive estimated degree of the drift anomaly for the overlapping period. In one embodiment, all the estimated degrees of the drift anomaly for an overlapping period are used to determine the conclusive estimated degree of the drift anomaly for the overlapping period. In another embodiment, some of the estimated degrees of the drift anomaly for an overlapping period are used to determine the conclusive estimated degree of the drift anomaly for the overlapping period.

Here, the amount of drift was used as the degree of drift anomaly. Also, it was assumed that the amount of drift accumulates linearly along with the lapse of time. Thus, methods including additions and subtractions were used. However, if different indicators are used as the degree of drift anomaly or different assumptions for the degree of drift anomaly are introduced, it is possible to estimate the degree of drift anomaly by using different methods.

In FIG. 9, a linear equation expressing how the degree of drift anomaly accumulates along with lapse of time is calculated based on the estimated degree of drift anomaly from sub-task C.

Based on the linear equation, the degree of drift anomaly accumulated within the period between the sub-period of sub-task C and the sub-period of sub-task D (interval between sub-periods) is estimated. Finally, the degree of drift anomaly from sub-task C, the degree of drift anomaly from sub-task D and the degree of drift anomaly from the interval between the sub-periods are added to estimate the degree of drift anomaly accumulated within the monitored period.

In FIG. 9, it was assumed that the degree of drift anomaly is accumulated linearly along with the lapse of time. Thus, the integration unit 6 can estimate the degree of drift anomaly accumulated within the excluded part of the monitored period, based on the degree of drift anomaly estimated for the sub-period, when estimating the degree of drift anomaly accumulated within the monitored period. Below, the excluded part of the monitored period is referred to as the uncovered period. However, it is possible to execute estimation processes based on different assumptions.

In the example of FIG. 8 and FIG. 9, the estimated degrees of drift anomaly from sub-tasks corresponding to earlier periods (sub-task A and sub-task C) were used as the base to estimate the degrees of drift anomaly accumulated within overlapping periods and uncovered periods. However, it is possible to use the estimated degrees of drift anomaly from sub-tasks corresponding to later periods (sub-task B and sub-task D) as the base to estimate the degrees of drift anomaly accumulated within overlapping periods and uncovered periods. In one embodiment, the estimated degrees of drift anomaly from all the sub-tasks are used to estimate the degrees of drift anomaly accumulated within overlapping periods and uncovered periods. Thus, the method used to estimate the degrees of drift anomaly for overlapping periods and uncovered periods is not limited.

Finally, the display device 7 displays the result of the main task (step S106). In one embodiment, the display device 7 displays the result of drift anomaly detection by comparing the estimated amount of drift with the threshold value specified during generation of the main task. In another embodiment, the display device 7 displays the degree of drift anomaly. In one embodiment, information such as the sensors which are subject to drift anomaly detection, the monitored period, the methods used for drift anomaly detection and the value of the parameters used are displayed.

Summarizing the description above, the information processing device according to the embodiment is described as follows. An information processing device 1 includes an anomaly detector 5 and an integration unit 6. The anomaly detector 5 estimates the degree of drift anomaly accumulated within a sub-period which is a part of a monitored period. Symptoms of drift include mismatches between actual values and measured values. The integration unit 6 estimates the degree of drift anomaly accumulated within the monitored period based on the degree of drift anomaly estimated by the anomaly detector 5.

Second Embodiment

In the first embodiment, the anomaly detector 5 provides the degree of drift anomaly. However, the type of information provided by the anomaly detector 5 is not limited. In another embodiment, the anomaly detector provides status information including the success/failure of the sub-task.

In an information processing device according to the second embodiment, the status information of the sub-tasks is used to repeat the generation and execution of the sub-task. Depending on the result of the executed sub-tasks, sub-tasks are regenerated. This process is called the adjustment process. By executing the adjustment process, the performance of drift anomaly detection is improved.

The anomaly detector 5 according to one embodiment returns status information for each sub-task. The status information includes at least success or failure of estimating drift anomalies. In another embodiment, the status information includes binary information indicating success/failure. In another embodiment, the status information includes continuous values. Examples of such values include the degree of reliability for the estimated degree of drift anomaly. In one embodiment, the status information is saved in the storage 105. In another embodiment, the status information is transmitted from the anomaly detector 5 to the sub-period generator 4.

Figure 10:
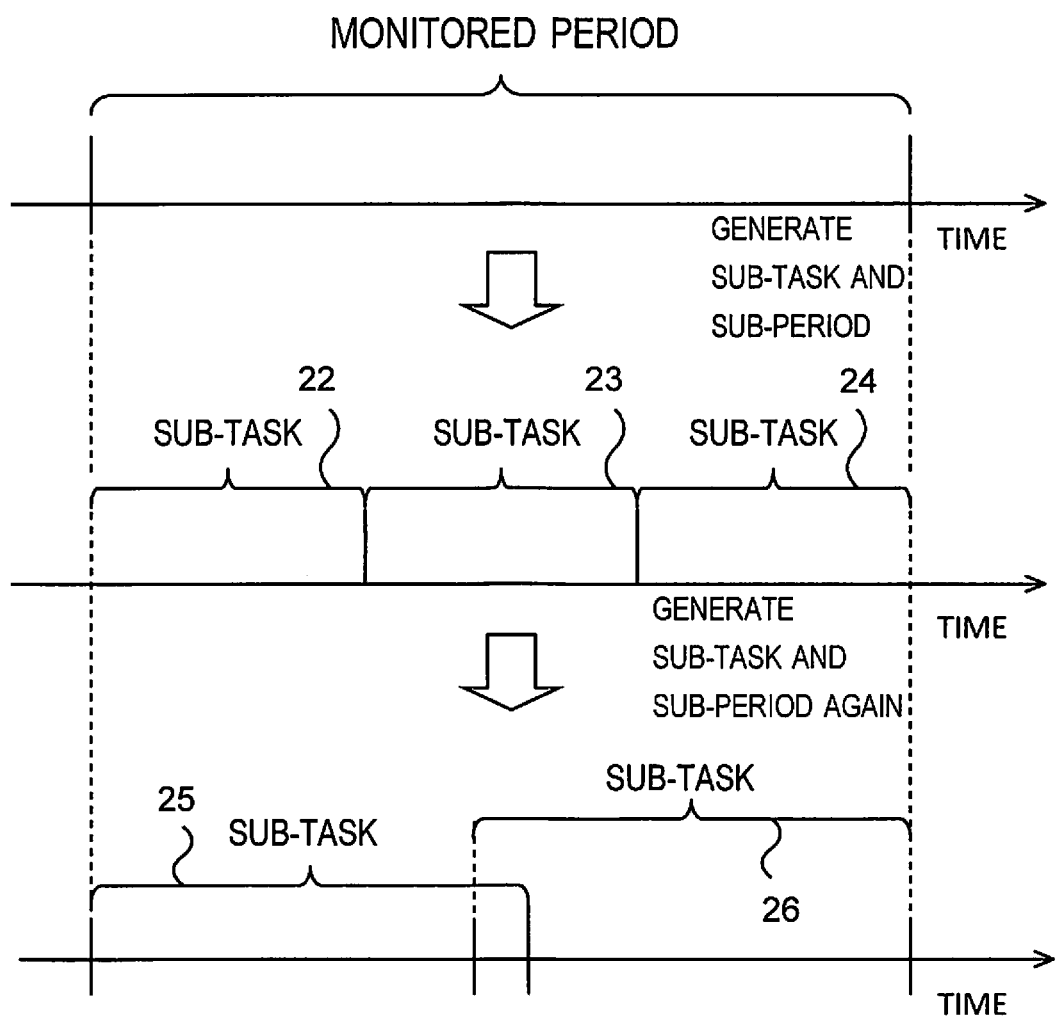
FIG. 10 is a diagram of a case when sub-tasks are repeatedly generated.

FIG. 10 is a diagram of a case when sub-tasks are repeatedly generated. In the following, a case when the status information includes binary values indicating success/failure is explained with reference to FIG. 10. The center of FIG. 10 includes sub-tasks generated by the sub-period generator 4. The bottom of FIG. 10 includes sub-tasks after execution of the adjustment process.

If status information for at least one sub-task is provided, the sub-period generator determines whether the adjustment process is necessary for the sub-task based on the corresponding status information. Here it is assumed that the status information from sub-tasks 22 and 23 indicates "success" and the status information from sub-task 24 indicates "failure".

Since execution of some of the sub-task failed, the sub-period generator 4 executes the adjustment process. The sub-tasks 25 and 26 at the bottom of FIG. 10 are the sub-tasks after the execution of the adjustment process. The sub-periods of the sub-tasks 25 and 26 are different from the sub-periods of the sub-tasks 22 to 24. In this case, all the sub-tasks were regenerated. If the results of both the sub-tasks 25 and 26 indicate "success", the results of the sub-tasks 25 and 26 are used in the main tasks. If either sub-task 25 or 26 returns "failure" in the status information, the sub-period generator 4 regenerates the sub-tasks. Then, the regenerated sub-tasks are executed.

The adjustment process of the sub-tasks is not limited to methods which regenerate all the sub-tasks, as illustrated in FIG. 10. For example, in one embodiment, only the results of the sub-tasks indicating "success" are used in the main task. In other words, the process which regenerates sub-tasks is not executed. Also, in another embodiment, the sub-tasks whose results indicate "success" are retained while the sub-tasks whose results indicate "failure" are regenerated until the execution of all the sub-tasks is successful.

In one embodiment, the status of success/failure is provided as a continuous value which indicates the degree of success. This degree of success is compared with a threshold value to determine the success/failure of execution. The sub-period generator 4 determines whether or not to regenerate the sub-task based on the comparison. For example, when the degree of success is greater than the threshold, it is determined that the execution of the sub-task is successful. When the degree of success is smaller than the threshold, it is determined that the execution of the sub-task is failed. In one embodiment, when the degree of success is equal to the threshold value, it is determined that the execution of the sub-task is successful. In another embodiment, when the degree of success is equal to the threshold value, it is determined that the execution of the sub-task is failed.

It is possible to select the methods used to determine the success/failure of execution of sub-tasks based on the method used by the anomaly detector 5. For example, if the number of measurements within the sub-period of the sub-task is not sufficient for estimating the degree of drift anomaly, it is possible to determine that execution is failed.

Figure 11:
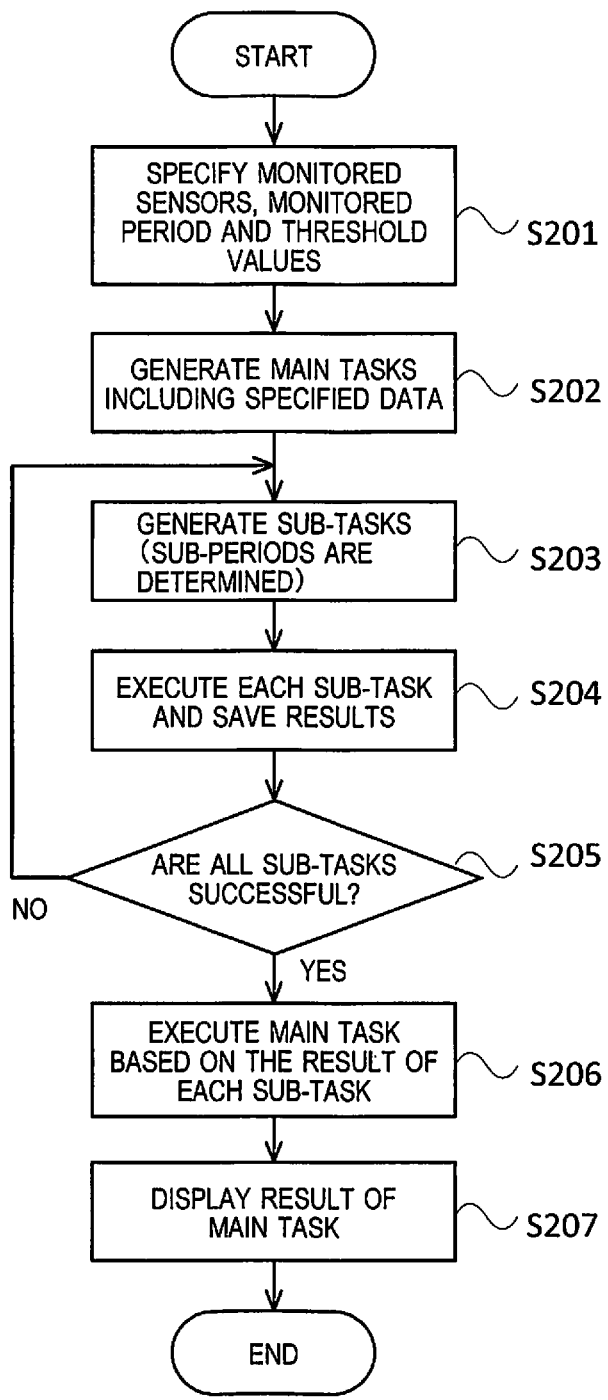
FIG. 11 is a flowchart of a process executed by the information processing device in accordance to a second embodiment.

FIG. 11 is a flowchart of a process executed by the information processing device in accordance to the second embodiment. In the flowchart of FIG. 11, sub-tasks are generated in step 203 and executed in step S204. After the results of the sub-tasks are saved, it is determined whether execution of all the sub-tasks is successful or not in step S205. If the result of step S205 is positive, the main task is executed using the results of the sub-tasks (step S206). If the result of step S205 is negative, the process returns to step S203 to regenerate sub-tasks.

Besides the addition of the aforementioned conditional judgment, the flowchart of FIG. 11 is similar to the flowchart according to the first embodiment, shown in FIG. 3.

Third Embodiment

Above, cases when each sub-task estimates a degree of drift anomaly were described as examples. However, in the third embodiment, a single sub-task estimates multiple degrees of drift anomaly. For example, it is possible to use pseudo-random numbers for changing the values of internal parameters within the anomaly detector and estimating the degree of drift anomaly multiple times. Methods which are used for estimating the degree of drift anomaly multiple times is not limited. By using multiple degrees of drift anomalies and their statistical features, it is possible to improve the accuracy of the estimation compared to cases when only one degree of drift anomaly is used.

In the following, the integration process of the degrees of drift anomaly for cases when the sub-task estimates a plurality of degrees of drift anomalies is described.

Let the number of sensors which are subject to anomaly detection be m and let the number of times that a sub-task #i estimates the degree of drift anomaly be $n_i$. In this case, the degrees of drift anomaly estimated by the sub-task #i are represented by using the matrix in (1) below.

$$D_i \in \mathbb{R}^{n_i \times m} \quad (1)$$

The degrees of drift anomaly $D_1$ estimated by the sub-task #1 and the degrees of drift anomaly $D_2$ estimated by the sub-task #2 is represented by using the matrices (2) below.

$$D_1 \in \mathbb{R}^{n_1 \times m} \quad (2)$$

$$D_2 \in \mathbb{R}^{n_2 \times m}$$

In the description below, it is assumed that the anomaly detector 5 estimates the amount of drift. Also, the sub-period of the sub-task #1 and the sub-period of the sub-task #2 do not have overlaps. Thus, the whole monitored period is covered by the sub-task #1 and the sub-task #2. Therefore, none of the periods within the monitored period are left uncovered by the sub-tasks. This assumption allows the integration of the degrees of drift anomaly from the sub-task #1 and the sub-task #2 to be the summation of the degrees. If there are overlaps in the sub-periods, it is possible to integrate the degrees of drift anomaly from the sub-task #1 and #2 by using the methods described with reference to FIG. 8 in the first embodiment. If some of the periods within the monitored period are not covered by either of the sub-periods, the degrees of drift anomaly for the corresponding periods are estimated by using the methods described with reference to FIG. 9 in the first embodiment.

Figure 12:
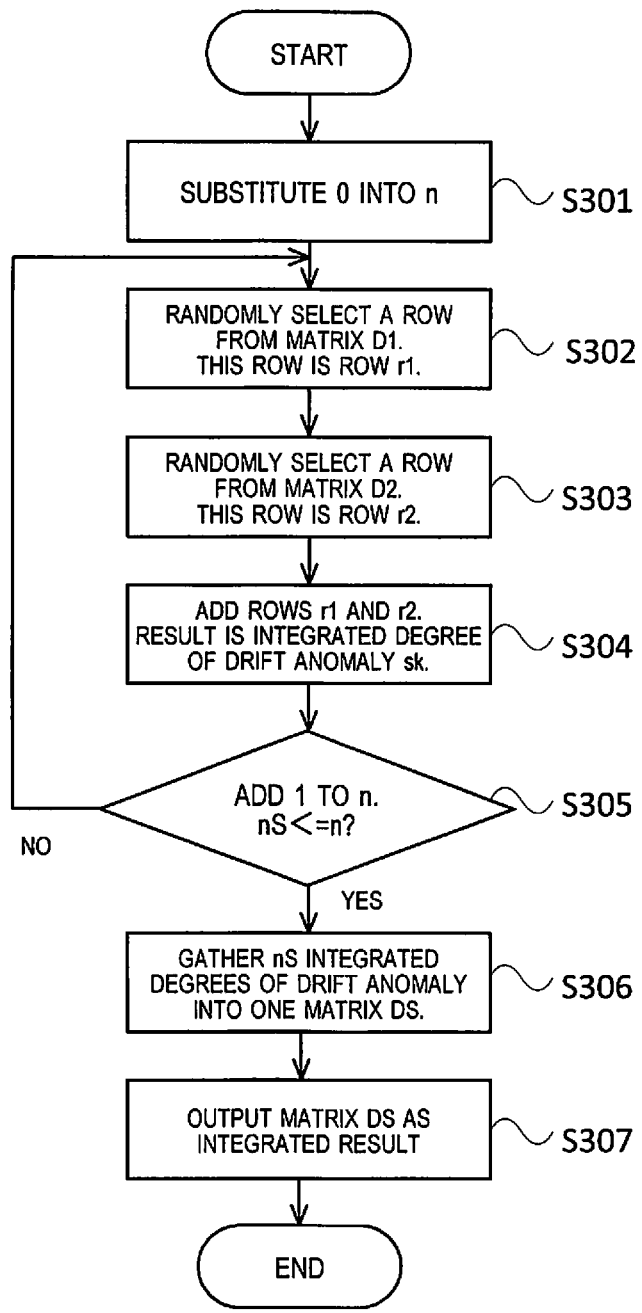
FIG. 12 is a flowchart of an integration process executed by the information processing device in accordance to a third embodiment.

FIG. 12 is a flowchart of an integration process executed by the information processing device in accordance to a third embodiment. In the following, the process is explained with reference to FIG. 12.

First, the integration unit 6 substitutes 0 to the loop variable n (step S301). The number of iterations is controlled by using the loop variable n. Next, the integration unit 6 randomly selects a row from the matrix $D_1$. Suppose that the selected row is $r_1 = [d_{11}, d_{12}, d_{13}, \ldots, d_{1m}]$ (step S302). The elements $d_{11}$ to $d_{1m}$ are degrees of drift anomaly on sensors, estimated in a trial of the sub-task #1. By transforming pseudo-random numbers to the row numbers according to a predefined rule, it is possible to randomly select rows. Methods to randomly select rows are not limited.

Similarly, the integration unit 6 randomly selects a row from the matrix $D_2$ as well. Suppose that the selected row is $r_2 = [d_{21}, d_{22}, d_{23}, \ldots, d_{2m}]$ (step S303). Here, the elements $d_{21}$ to $d_{2m}$ are degrees of drift anomaly on sensors, estimated in a trial of the sub-task #2. Next, the integration unit 6 adds the rows r1 and r2, calculating the integrated degrees of drift anomaly $s_k = [d_{11}+d_{21}, d_{12}+d_{22}, d_{13}+d_{23}, \ldots, d_{1m}+d_{2m}]$. Here, $s_k$ indicates the integrated degrees of drift anomaly calculated when the value of the loop variable n is k. (step S304). $s_k$ is saved in the storage 105.

Next, the integration unit 6 adds 1 to the value of loop variable n. It is determined whether the value of the loop variable is equal to or greater than $n_s$ (step S305). Depending on the result of step S305, the process branches. If the relation $n_s > n$ holds, the process returns to step S302 to execute random selection of rows.

If the relation $n_s \leq n$ holds, the integration unit 6 gathers the $n_s$ integrated degrees of drift anomalies into one matrix $D_s$ (step S306). An example of the matrix $D_s$ is $[s_1^T, s_2^T, \ldots, s_{ns}^T]^T$. However, the orders of the vectors within the matrix $D_s$ are not limited. The dimension of the matrix $D_s$ is represented as (3) below.

$$D_S \in \mathbb{R}^{nS \times m} \quad (3)$$

Finally, the matrix $D_s$ is provided as an integrated result. The integration unit 6 saves the data of the matrix $D_s$ to the storage 105. Also, the data of matrix $D_s$ is visualized by the display device 7 (step S307). In one embodiment, all the elements of the matrix $D_s$ are displayed. In another embodiment, the mean and the variance of degrees of drift anomaly on each sensor in the $n_s$ random selections are displayed. Also, by calculating statistical values such as the mean and the variance in the $n_s$ random selections for each sensor, it is possible to determine whether drift anomalies are detected or not. Then, the results are displayed.

FIG. 13 is a diagram of results shown on a display device. Here, the display device includes the display device 7 and the display device 103. In the example of FIG. 13, the monitored period is set from March 2013 to November 2017. In the table of FIG. 13, the names of the sensors, the mean degrees of drift anomalies and the results of drift anomaly detection are displayed. Regarding the sensor 3, it is determined that a drift anomaly occurred. The results displayed by the information processing devices according to the first and the second embodiments are the same as FIG. 13 except that the mean degree of drift anomaly is altered to the degree of drift anomaly.

In one embodiment, the process to integrate degrees of drift anomaly (S302, S303, S304) is performed for all the combinations which could be generated from the rows in the matrix $D_1$ and the matrix $D_2$. In this case, $n_s$ is equal to $n_1*n_2$, which takes large values in some cases. By randomly selecting rows, it is possible to prevent the size of the matrix $D_s$ from exploding.

By using the information processing devices according to the above embodiments, it is possible to enhance the performance of detecting drift anomalies accumulated over a long time. Thus, the maintenance of sensors could be performed more efficiently.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing device comprising:
an anomaly detector configured to estimate a degree of drift anomaly accumulated within a sub-period which is part of a monitored period based on measured values of a sensor during the sub-period; and
an integration unit configured to estimate a degree of drift anomaly accumulated within a whole of the monitored period based on the degree of drift anomaly accumulated within the sub-period;
wherein symptoms of the drift anomaly include mismatches between actual values and measured values.

2. The information processing device according to claim 1, wherein
the integration unit is configured to determine whether the drift anomaly has occurred based on an estimated degree of drift anomaly accumulated within the whole of the monitored period.

3. The information processing device according to claim 2, further comprising a display device which is configured to display at least whether the drift anomaly has occurred or the degree of drift anomaly on the sensor.

4. The information processing device according to claim 2, wherein
the degree of drift anomaly is an amount of drift indicating a size of mismatch between the actual values and the measured values of the sensor, and
the integration unit is configured to estimate the amount of drift accumulated within the whole of the monitored period.

5. The information processing device according to claim 2, further comprising a sub-period generator which is configured to generate the sub-period.

6. The information processing device according to claim 5, wherein
the sub-period generator is configured to generate a plurality of sub-periods, and the integration unit is configured to determine whether the drift anomaly has occurred within the monitored period by estimating the degree of drift anomaly accumulated within the monitored period based on the estimated degrees of drift anomaly accumulated within the sub-periods.

7. The information processing device according to claim 6, wherein
the anomaly detector is configured to concurrently estimate the degrees of drift anomaly based on the measured values of the sensors during the plurality of sub-periods.

8. The information processing device according to claim 6, wherein
the sub-period generator is configured to generate sub-periods with overlapping periods, and
the integration unit is configured to use the estimated degree of drift anomaly for at least one of the sub-periods if the sub-periods include overlapping periods, when estimating the degree of drift anomaly accumulated within the whole of the monitored period.

9. The information processing device according to claim 6, wherein
the sub-period generator is configured to generate sub-periods by dividing the monitored period.

10. The information processing device according to claim 5, wherein
the sub-period generator is configured to generate a sub-period excluding a part of the monitored period, and
the integration unit is configured to estimate the degree of drift anomaly accumulated within the excluded part of the monitored period, based on the degree of drift anomaly estimated for the sub-period, when estimating the degree of drift anomaly accumulated within the whole of the monitored period.

11. The information processing device according to claim 5, wherein
the anomaly detector is configured to calculate a degree of reliability of the degree of drift anomaly estimated for the sub-period, and
the sub-period generator is configured to determine whether the sub-period is generated again or not, based on the degree of reliability.

12. The information processing device according to claim 5, wherein
the anomaly detector is configured to determine whether estimation of the degree of drift anomaly is successful for the sub-period, and
the sub-period generator is configured to generate the sub-period again if the anomaly detector determines that the estimation of the degree of drift anomaly is failed.

13. The information processing device according to claim 1, wherein
the anomaly detector is configured to estimate the degree of drift anomaly multiple times for the sub-period, and
the integration unit is configured to determine whether the drift anomaly has occurred in the sensor by selecting the degrees of drift anomaly and estimating the degree of drift anomaly accumulated within the whole of the monitored period, multiple times.

14. An information processing method comprising the steps of:
   generating a sub-period which is part of a monitored period;
   estimating a degree of drift anomaly accumulated within the sub-period based on measured values of a sensor during the sub-period;
   estimating a degree of drift anomaly accumulated within a whole of the monitored period, based on the estimated degree of drift anomaly for the sub-period;
   determining whether a drift anomaly has occurred in the sensor based on the estimated degree of drift anomaly accumulated within the whole of the monitored period; and
   displaying whether the drift anomaly has occurred in the sensor,
   wherein symptoms of the drift anomaly include mismatches between actual values and measured values.

15. A non-transitory storage medium having a computer program stored therein which causes a computer to execute processes comprising:
   generating a sub-period which is part of a monitored period;
   estimating a degree of drift anomaly accumulated within the sub-period based on measured values of a sensor during the sub-period;
   estimating a degree of drift anomaly accumulated within a whole of the monitored period, based on the estimated degree of drift anomaly for the sub-period;
   determining whether a drift anomaly has occurred in the sensor based on the estimated degree of drift anomaly accumulated within the whole of the monitored period; and
   displaying whether the drift anomaly has occurred in the sensor,
   wherein symptoms of the drift anomaly include mismatches between actual values and measured values.

16. An information processing device comprising:
   an anomaly detector configured to estimate a degree of drift anomaly based on measured values of a sensor during a sub-period which is a part of a monitored period; and
   an integration unit configured to estimate the degree of drift anomaly accumulated within the monitored period based on the degrees of drift anomaly accumulated within the sub-periods;
   wherein
   symptoms of a drift anomaly include mismatches between the actual values and measured values,
   the integration unit is configured to determine whether the drift anomaly has occurred based on an estimated degree of drift anomaly accumulated within the monitored period,
   the device further comprising a sub-period generator which is configured to generate the sub-period,
   the sub-period generator is configured to generate a plurality of sub-periods, and the integration unit is configured to determine whether the drift anomaly has occurred within the monitored period by estimating the degree of drift anomaly accumulated within the monitored period based on the estimated degrees of drift anomaly accumulated within the sub-periods,
   the sub-period generator is configured to generate sub-periods with overlapping periods, and
   the integration unit is configured to use the estimated degree of drift anomaly for at least one of the sub-periods if the sub-periods include overlapping periods, when estimating the degree of drift anomaly accumulated within the monitored period.

17. An information processing device comprising:
   an anomaly detector configured to estimate a degree of drift anomaly based on measured values of a sensor during a sub-period which is a part of a monitored period; and
   an integration unit configured to estimate the degree of drift anomaly accumulated within the monitored period based on the degrees of drift anomaly accumulated within the sub-periods;
   wherein
   symptoms of a drift anomaly include mismatches between the actual values and measured values,
   the integration unit is configured to determine whether the drift anomaly has occurred based on an estimated degree of drift anomaly accumulated within the monitored period,
   the device further comprising a sub-period generator which is configured to generate the sub-period,
   the sub-period generator is configured to generate a sub-period excluding a part of the monitored period, and
   the integration unit is configured to estimate the degree of drift anomaly accumulated within the excluded part of the monitored period, based on the degree of drift anomaly estimated for the sub-period, when estimating the degree of drift anomaly accumulated within the monitored period.

18. An information processing device comprising:
   an anomaly detector configured to estimate a degree of drift anomaly based on measured values of a sensor during a sub-period which is a part of a monitored period; and
   an integration unit configured to estimate the degree of drift anomaly accumulated within the monitored period based on the degrees of drift anomaly accumulated within the sub-periods;
   wherein
   symptoms of a drift anomaly include mismatches between the actual values and measured values,
   the integration unit is configured to determine whether the drift anomaly has occurred based on an estimated degree of drift anomaly accumulated within the monitored period,
   the device further comprising a sub-period generator which is configured to generate the sub-period,
   the anomaly detector is configured to calculate a degree of reliability of the degree of drift anomaly estimated for the sub-period, and
   the sub-period generator is configured to determine whether the sub-period is generated again or not, based on the degree of reliability.

19. An information processing device comprising:
   an anomaly detector configured to estimate a degree of drift anomaly based on measured values of a sensor during a sub-period which is a part of a monitored period; and
   an integration unit configured to estimate the degree of drift anomaly accumulated within the monitored period based on the degrees of drift anomaly accumulated within the sub-periods;
   wherein
   symptoms of a drift anomaly include mismatches between the actual values and measured values, the integration unit is configured to determine whether the drift anomaly has occurred based on an estimated degree of drift anomaly accumulated within the monitored period, the device further comprising a sub-period generator which is configured to generate the sub-period, the anomaly detector is configured to determine whether estimation of the degree of drift anomaly is successful for the sub-period, and the sub-period generator is configured to generate the sub-period again if the anomaly detector determines that the estimation of the degree of drift anomaly is failed.

* * * * *